(12) United States Patent
Cuan et al.

(10) Patent No.: US 12,231,386 B2
(45) Date of Patent: *Feb. 18, 2025

(54) STORAGE SPACE OPTIMIZATION FOR EMAILS

(71) Applicant: Capital One Services, LLC, McLean, VA (US)

(72) Inventors: Lukiih Cuan, Washington, DC (US); Michael Mossoba, Great Falls, VA (US); Cruz Vargas, Denver, CO (US); Lea Cody, Washington, DC (US); Latika Gulati, Vienna, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/449,001

(22) Filed: Aug. 14, 2023

(65) Prior Publication Data

US 2023/0388260 A1 Nov. 30, 2023

Related U.S. Application Data

(63) Continuation of application No. 17/648,338, filed on Jan. 19, 2022, now Pat. No. 11,757,818.

(51) Int. Cl.
*G06F 15/16* (2006.01)
*G06V 30/19* (2022.01)
(Continued)

(52) U.S. Cl.
CPC ............ *H04L 51/212* (2022.05); *G06V 30/19* (2022.01); *H04L 51/10* (2013.01); *H04L 51/42* (2022.05)

(58) Field of Classification Search
CPC ........ H04L 51/10; H04L 51/42; H04L 51/212
See application file for complete search history.

(56) References Cited

U.S. PATENT DOCUMENTS

| 8,161,122 B2 | 4/2012 | Sood et al. |
| 9,323,784 B2 | 4/2016 | King et al. |
| (Continued) | | |

FOREIGN PATENT DOCUMENTS

| ES | 2736315 T3 | 12/2019 |
| KR | 20090030969 A | 3/2009 |
| (Continued) | | |

OTHER PUBLICATIONS

Co-pending U.S. Appl. No. 17/648,338, inventors Cuan; Lukiih et al., filed Jan. 19, 2022.

(Continued)

*Primary Examiner* — Yves Dalencourt
(74) *Attorney, Agent, or Firm* — Harrity & Harrity, LLP

(57) ABSTRACT

In some implementations, a storage optimization system may receive a plurality of emails. Accordingly, the system may identify at least one email associated with a limited capacity in the plurality of emails. The system may further scan, from the at least one email, one or more hyperlinks to determine a website associated with the at least one email and an identifier associated with an event. The system may determine, using a database, a traversal path and at least one application programming interface (API) call associated with the website. Accordingly, the system may traverse the website using the traversal path and the at least one API using the identifier to determine that the limited capacity is filled. The system may delete the at least one email associated with the limited capacity based on determining that the limited capacity is filled.

20 Claims, 11 Drawing Sheets

(51) Int. Cl.
    *H04L 51/10*     (2022.01)
    *H04L 51/212*     (2022.01)
    *H04L 51/42*     (2022.01)

(56) References Cited

U.S. PATENT DOCUMENTS

| | | |
|---|---|---|
| 9,553,837 B2 | 1/2017 | Sobhani |
| 10,701,005 B2 | 6/2020 | Nutt et al. |
| 11,757,818 B2 * | 9/2023 | Cuan .................. G06V 30/19 709/204 |
| 2004/0117451 A1 | 6/2004 | Chung |
| 2013/0218986 A1 | 8/2013 | Sobhani |
| 2015/0139506 A1 | 5/2015 | Wang et al. |
| 2015/0331881 A1 | 11/2015 | Myles |
| 2017/0093778 A1 | 3/2017 | Jones |
| 2019/0379625 A1 | 12/2019 | Coffey et al. |

FOREIGN PATENT DOCUMENTS

| | | |
|---|---|---|
| KR | 20140094893 A | 7/2014 |
| KR | 20170143261 A | 12/2017 |

OTHER PUBLICATIONS

IP.com., "Analyze Email To Determine Coupon Expired Or Not Using Text Analytics," An IP.com Prior Art Database Technical Disclosure, Authors et. al.: Disclosed Anonymously, Jul. 30, 2013, 3 pages.
IP.com., "Managing Email Coupons and Special Offers," Feb. 4, 2009, ip.com No. IPCOM000179021D, 3 pages.

\* cited by examiner

STORAGE SPACE OPTIMIZATION FOR EMAILS

RELATED APPLICATION

This application is a continuation of U.S. patent application Ser. No. 17/648,338, filed Jan. 19, 2022, which is incorporated herein by reference in its entirety.

BACKGROUND

Both servers and user devices often use significant amounts of storage space for emails and Internet cache. For example, a single email account may occupy multiple gigabytes (GBs) of storage space, and a user may use one server or user device for multiple email accounts. Similarly, Internet caches can often occupy hundreds of megabytes (MBs), if not multiple GBs, on a user device.

SUMMARY

Some implementations described herein relate to a system for optimizing email storage space. The system may include one or more memories and one or more processors communicatively coupled to the one or more memories. The one or more processors may be configured to receive a plurality of emails. The one or more processors may be further configured to identify at least one email associated with a limited capacity in the plurality of emails and at least one email associated with a limited time window in the plurality of emails. The one or more processors may be configured to scan, from the at least one email associated with the limited capacity, one or more hyperlinks to determine a website. The one or more processors may be further configured to traverse the website to perform at least one application programming interface (API) call to determine that the limited capacity is filled. The one or more processors may be configured to delete the at least one email associated with the limited capacity based on determining that the limited capacity is filled. The one or more processors may be further configured to scan, from the at least one email associated with the limited time window, text and optical character recognition (OCR) output based on at least one image to determine an expiry date. The one or more processors may be configured to delete the at least one email associated with the limited time window based on determining that the expiry date is passed.

Some implementations described herein relate to a method of optimizing email storage space. The method may include receiving a plurality of emails. The method may further include identifying at least one email associated with a limited capacity in the plurality of emails. The method may include scanning, from the at least one email, one or more hyperlinks to determine a website associated with the at least one email and an identifier associated with an event. The method may further include determining, using a database, a traversal path and at least one API call associated with the website. The method may include traversing the website using the traversal path and the at least one API using the identifier to determine that the limited capacity is filled. The method may further include deleting the at least one email associated with the limited capacity based on determining that the limited capacity is filled.

Some implementations described herein relate to a non-transitory computer-readable medium that stores a set of instructions for a device. The set of instructions, when executed by one or more processors of the device, may cause the device to receive a plurality of emails. The set of instructions, when executed by one or more processors of the device, may further cause the device to identify at least one email associated with a limited time window in the plurality of emails. The set of instructions, when executed by one or more processors of the device, may cause the device to convert at least one image, included in the at least one email, to text using OCR. The set of instructions, when executed by one or more processors of the device, may further cause the device to scan text from the at least one email and text from the OCR to determine an expiry date associated with the at least one email. The set of instructions, when executed by one or more processors of the device, may cause the device to delete the at least one email associated with the limited time window based on determining that the expiry date is passed.

DETAILED DESCRIPTION

The following detailed description of example implementations refers to the accompanying drawings. The same reference numbers in different drawings may identify the same or similar elements.

Some users keep emails stored on a remote server (e.g., a Gmail® server, a Hotmail® server, and/or another server associated with an email service) while other users keep emails stored locally (e.g., on a desktop computer, a mobile phone, and/or another user device). Emails, however, consume significant amounts of storage space, often beyond five or ten gigabytes (GBs). Additionally, a user may use multiple email addresses, which further multiplies how much storage space is consumed by emails. Accordingly, some implementations described herein provide for a system that intelligently removes emails based on detecting an associated expiry date and/or an associated limited capacity being filled. As a result, the system improves user experience and conserves storage space at either the remote server or at the user device locally.

Similarly, user devices retain caches of website information and other Internet information that a user has accessed in the past. However, searching through caches for relevant information consumes power and processing resources at user devices. Accordingly, some implementations described herein provide for a system that intelligently sorts content in an Internet-based cache based on detecting an associated expiry date and/or an associated limited capacity being filled. For example, an extension associated with a browser application may extract relevant information from the cache in the background while a user accesses websites through the browser application. As a result, the system improves user experience and conserves power and processing resources as compared with searching through the cache.

FIGS. 1A-1D are diagrams of an example 100 associated with storage space optimization for emails. As shown in FIGS. 1A-1D, example 100 includes an email server, a storage optimization system, a storage, and a user device. These devices are described in more detail in connection with FIGS. 3 and 5.

Figure 1A:
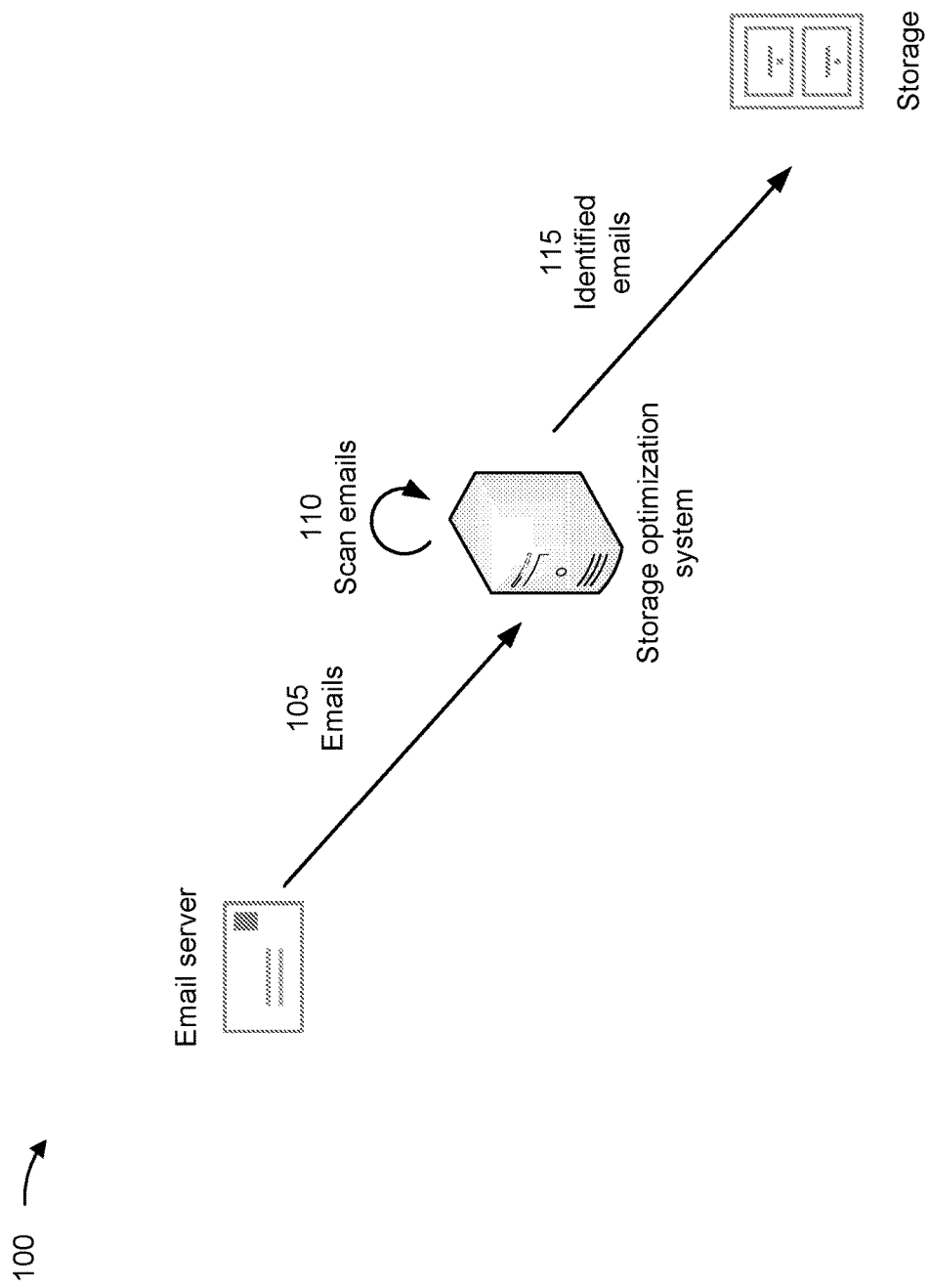
FIGS. 1A-1D are diagrams of an example implementation relating to storage space optimization for emails.

As shown in FIG. 1A and by reference number 105, the storage optimization system may receive emails (e.g., a plurality of emails). For example, the storage optimization system may receive the emails from an email server. In some implementations, the storage optimization system may be at least partially integrated (e.g., physically, virtually, and/or logically) with the email server. Accordingly, the storage optimization system may receive the emails from a storage included in the email server. As an alternative, the storage optimization system may be at least partially integrated (e.g., physically, virtually, and/or logically) with the user device. Accordingly, the storage optimization system may receive the emails from a storage included in the user device. The storage optimization system may receive the emails periodically (e.g., using a push function or a pull function that executes according to a schedule) and/or on-demand (e.g., using a push function each time a new email arrives at the email server and/or the user device or using a pull function based on input from a user).

As shown by reference number 110, the storage optimization system may scan the emails. Accordingly, as shown by reference number 115, the storage optimization system may identify an email (e.g., at least one email) associated with a limited time window. The storage optimization system may move (or copy) the identified email to a partition (e.g., physical, virtual, and/or logical), of a storage, that is associated with limited time windows. As an alternative, the storage optimization system may store a flag and/or other indicator in the storage having the emails (e.g., included in the email server or included in the user device) such that the identified email is indicated as being associated with a limited time window. The storage optimization system may process the email associated with the limited time window as described in connection with FIG. 1B.

Additionally, or alternatively, and as shown by reference number 115, the storage optimization system may identify an email (e.g., at least one email) associated with a limited capacity. The storage optimization system may move (or copy) the identified email to a partition (e.g., physical, virtual, and/or logical), of a storage, that is associated with limited capacities. As an alternative, the storage optimization system may store a flag and/or other indicator in the storage having the emails (e.g., included in the email server or included in the user device) such that the identified email is indicated as being associated with a limited capacity. The storage optimization system may process the email associated with the limited capacity as described in connection with FIGS. 1C and 1D.

In some implementations, the identifications described above may be determined as described in connection with FIGS. 1B and 1C (e.g., determining an expiry date and determining a website, respectively). As an alternative, the identifications described above may use a sorting function such that the determinations described in connection with FIGS. 1B and 1C refine the sorting and reject emails that were incorrectly sorted as associated with a limited time window or a limited capacity. The sorting function may use regular expressions (e.g., one or more regular expressions or regexes) that identify patterns associated with dates (e.g., "##/##/##"; "##/##/####"; "expires on ##/##/##"; "valid until ##/##/####"; and/or other similar patterns) and/or identify patterns associated with capacity (e.g., "while supplies last"; "limited stock available"; "purchase tickets at"; and/or other similar patterns). In some implementations, the regexes may apply to images as well as text. For example, the storage optimization system may convert an image (e.g., at least one image), included in an identified email, to text using an optical character recognition (OCR) algorithm.

Figure 1B:
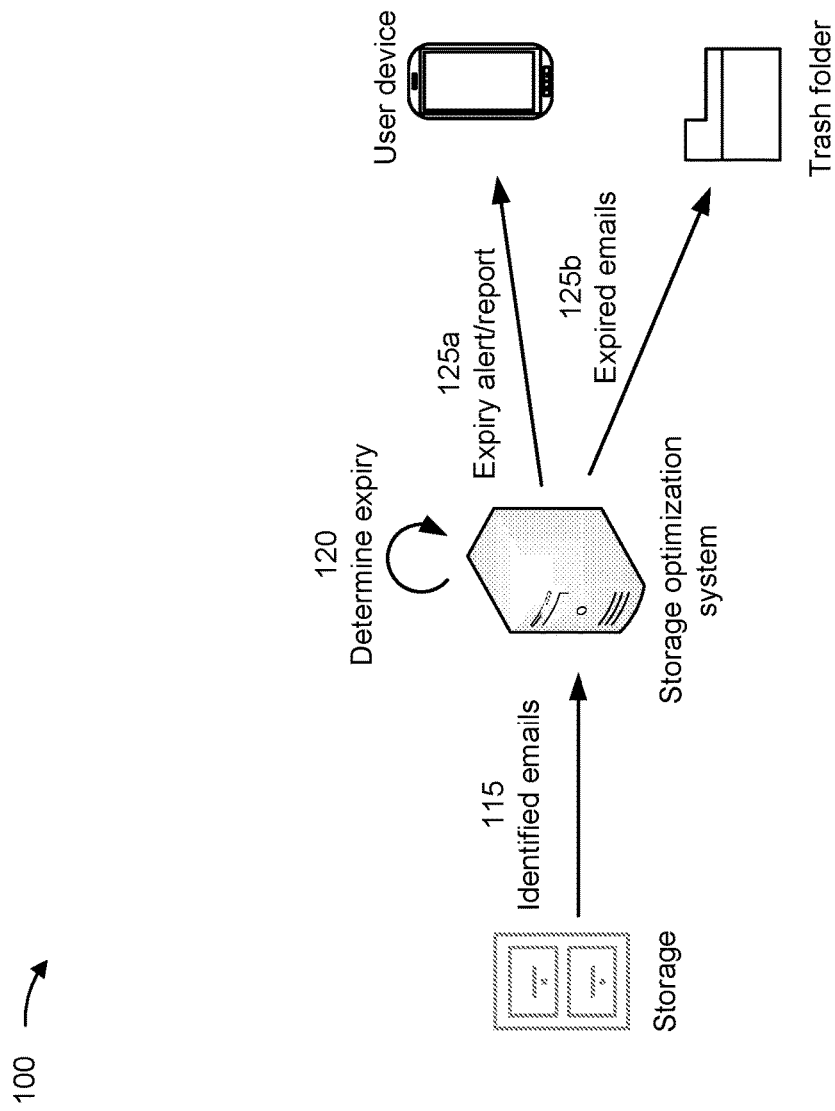
Figure 1C:
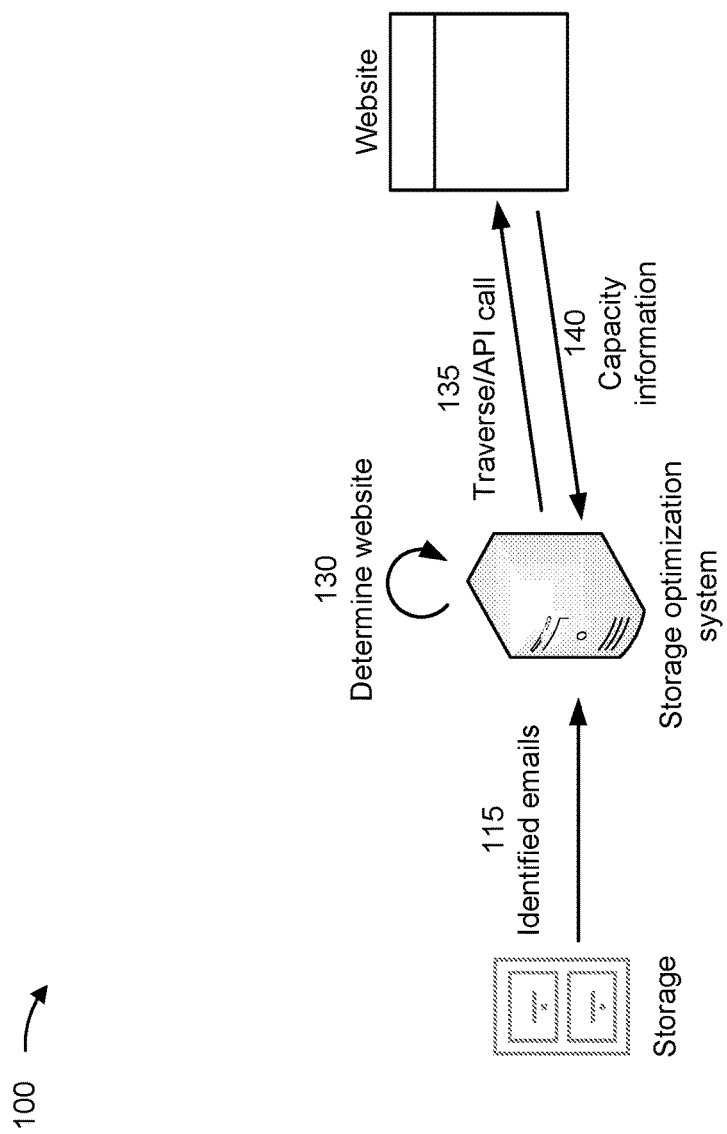

As shown in FIG. 1B and by reference number 120, the storage optimization system may determine an expiry date associated with the identified email that is associated with the limited time window. For example, the storage optimization system may scan, from the email associated with the limited time window, text and/or OCR output based on an image (e.g., at least one image) included in the email, to determine an expiry date. In some implementations, the storage optimization system may determine the expiry date using a machine learning model. For example, the storage optimization system may use an artificial neural network (ANN), a linear regression, and/or another model trained on historical emails and associated expiry dates. The machine learning model may use preconfigured features (e.g., words like "expires"; phrases like "valid until"; and/or patterns like "MONTH ##") to identify an associated expiry date. Additionally, or alternatively, the machine learning model may be a deep learning model such that the model may extract new features to identify an associated expiry date. Accordingly, in some implementations, the storage optimization system may feed back the determined expiry date and the email to update the machine learning model (e.g., to update parameters associated with nodes in a neural network) such that the machine learning model continues to improve in accuracy.

Additionally, or alternatively, to determine the expiry date, the storage optimization system may apply a series of regexes to the text and/or the OCR output. For example, as described above, the regexes may identify patterns associated with dates (e.g., "##/##/##"; "##/##/####"; "expires on ##/##/##"; "valid until ##/##/####"; and/or other similar patterns) to identify the associated expiry date.

As shown by reference number 125a, the storage optimization system may transmit a report or an alert to a user (e.g., via the user device), associated with the email, that indicates the expiry date. For example, the report or alert may include a plaintext email or text message, a hypertext markup language (HTML) email, a portable document format (PDF) file, and/or another electronic version of the report. In some implementations, the report or alert may further indicate expiry dates that are associated with additional emails that the storage optimization system identifies as being associated with limited time windows.

In some implementations, the storage optimization system may determine that the expiry date is within a threshold amount of time of a current date such that the storage optimization system transmits the report based thereon. For example, a time difference between the expiry date and the current date satisfying the threshold amount of time may trigger the storage optimization system to generate the report indicating the expiry date. Additionally, or alternatively, the storage optimization system may generate a periodic report (e.g., weekly, daily, and/or according to another interval) such that the expiry date is included in the periodic report when the time difference between the expiry date and the current date satisfies the threshold amount of time. The threshold amount of time may be preconfigured or may be determined according to a setting (e.g., input by the user via the user device).

Additionally, or alternatively, the storage optimization system may determine that an item associated with the expiry date is consistent with a profile associated with the user such that the storage optimization system transmits the report based thereon. For example, the storage optimization system may scan, from the email associated with the limited time window, text and/or OCR output based on an image (e.g., at least one image) included in the email, to identify the item. In some implementations, the storage optimization system may determine the item using a machine learning model. For example, the storage optimization system may use an ANN, a linear regression, and/or another model trained on historical emails and associated items. The machine learning model may use preconfigured features to identify an associated item and/or may be a deep learning model such that the model may extract new features to identify an associated item. Additionally, or alternatively, to identify the item, the storage optimization system may apply a series of regexes to the text and/or the OCR output. For example, as described above, the regexes may identify patterns associated with item titles, descriptions, and/or categories to identify the associated item. The storage optimization system may identify (e.g., using the model and/or the regexes, as described above) an identifier associated with the item (e.g., an alphanumeric sequence associated with the item, such as a model number, a serial number, or an inventor number, and/or another identifier).

In some implementations, the storage optimization system may determine that the item is consistent with the profile using a machine learning model. For example, the storage optimization system may use an ANN, a linear regression, and/or another model trained on historical information regarding item purchases associated with the user. In some implementations, the storage optimization system may receive the historical information from, or be at least partially integrated with, a remote server associated with a financial account of the user and/or a merchant account of the user. The machine learning model may use preconfigured features (e.g., keywords in item titles or descriptions, categories associated with items, and/or other similar features) to identify a similarity score (and/or another measure of similarity between the item and the profile associated with the user). Additionally, or alternatively, the machine learning model may be a deep learning model such that the model may extract new features to identify an associated similarity score. The storage optimization system may determine that the item is consistent with the profile associated with the user when the similarity score satisfies a consistency threshold.

In some implementations, the storage optimization system may receive feedback from the user (e.g., via the user device) to update the machine learning model (e.g., to update parameters associated with nodes in a neural network) such that the machine learning model continues to improve in accuracy. For example, the storage optimization system may generate and transmit (e.g., to the user device) a query regarding whether the user is interested in the item. The storage optimization system may further receive an indication that the user was interested and update the machine learning model based thereon.

Additionally, or alternatively, the storage optimization system may determine that the item is consistent with the profile using a series of regexes. For example, as described above, the regexes may identify patterns associated with item titles, descriptions, and/or categories that match titles, descriptions, and/or categories, respectively, of items associated with the profile.

Additionally, or alternatively, the storage optimization system may delete the email associated with the limited time window based on determining that the expiry date is passed. As a result, the storage optimization system automatically conserves storage space at the email server or the user device. Additionally, because the storage optimization system may perform operations described above in the background, the user experience is improved as compared with using retention rules programmed by the user.

In some implementations, the storage optimization system may further determine, using a database, a traversal path and an application programming interface (API) call (e.g., at least one API call) associated with a website indicated in the email. For example, the storage optimization system may identify the website indicated in the email as described in connection with FIG. 1C. Further, the storage optimization system may query the database (e.g., a tabular database, a graphical database, and/or another type of data structure that stores first information in association with at least second information), using a string or other data structure indicating the website, to receive an indication of a traversal path (e.g., a series of uniform resource locators (URLs) and/or other identifiers) and an indication of an API call (e.g., an identification of the API function and one or more parameters to include with the API call) that are associated with the website in the database.

Accordingly, the storage optimization system may traverse the website using the traversal path and the API. For example, the storage optimization system may execute one or more get functions or otherwise move through the series of URLs indicated by the traversal path. Additionally, the storage optimization system may perform the API call to determine whether the item associated with the email is unavailable. For example, the storage optimization system may include an identifier associated with the item (e.g., identified as described above) as an argument to the API call to receive output from the API indicating whether the item is unavailable (e.g., a Boolean indicating whether the item is in stock, an integer indicating a quantity of the item that remains in inventory, and/or similar output). Accordingly, the storage optimization system may delete the email further based on the item being unavailable. As a result, the storage optimization system automatically conserves storage space at the email server or the user device. Additionally, because the storage optimization system may perform operations described above in the background, the user experience is improved as compared with using retention rules programmed by the user.

In some implementations, as further shown by reference number 125b, the storage optimization system may delete the email associated with the limited time window by moving the email associated with the limited time window to a new folder (shown as a trash folder in example 100). The storage optimization system may move the email by physically or logically moving an electronic copy (e.g., a file) of the email across storages (or partitions of a storage) or by flagging the email for deletion. Accordingly, the storage optimization system may delete the email associated with the limited time window from the new folder after a threshold amount of time has passed. Accordingly, in some implementations, the user may recover the email from the new folder before the threshold amount of time has passed.

Although described using a single expiry date and/or single item associated with the email, the description similarly applies when the email is associated with a plurality of expiry dates and/or a plurality of items. For example, the storage optimization system may delete the email when the plurality of expiry dates have passed, when the plurality of items are not available, or a combination thereof.

Additionally with, or alternatively to, processing the email associated with the limited time window as described in connection with FIG. 1B, the storage optimization system may process the email associated with the limited capacity. For example, as shown in FIG. 1C and by reference number 130, the storage optimization system may determine a website associated with the identified email that is associated with the limited capacity. For example, the storage optimization system may scan, from the email associated with the limited capacity, hyperlinks (e.g., one or more hyperlinks) to determine a website associated with the email. In some implementations, the storage optimization system may additionally or alternatively scan OCR output based on an image (e.g., at least one image) included in the email, to determine the website. The storage optimization system may determine the website using a machine learning model. For example, the storage optimization system may use an ANN, a linear regression, and/or another model trained on historical emails and associated websites. The machine learning model may use preconfigured features (e.g., words like "link"; phrases like "click here"; and/or patterns like "https://WEBSITE") to identify an associated website. Additionally, or alternatively, the machine learning model may be a deep learning model such that the model may extract new features to identify an associated website. Accordingly, in some implementations, the storage optimization system may feed back the determined website and the email to update the machine learning model (e.g., to update parameters associated with nodes in a neural network) such that the machine learning model continues to improve in accuracy.

Additionally, or alternatively, to determine the website, the storage optimization system may apply a series of regexes to the text and/or the OCR output. For example, as described above, the regexes may identify patterns associated with website names (e.g., "https://WEBSITE"; "www.WEBSITE"; and/or other similar patterns) to identify the associated website. Accordingly, the storage optimization system may apply pattern recognition to the hyperlinks to determine the website. The storage optimization system may further identify (e.g., using the model and/or the regexes, as described above) an identifier associated with the event (e.g., an alphanumeric sequence associated with the event). For example, the storage optimization system may apply pattern recognition (e.g., extracting a portion between "?event_id=" and a terminus like "/") to the hyperlinks to determine the identifier.

In some implementations, the storage optimization system may determine the website using a data structure that associates at least a portion of the hyperlinks with an identifier of the website. For example, a database (e.g., a tabular database, a graphical database, and/or another type of data structure that stores first information in association with at least second information) may associate portions of hyperlinks (e.g., a portion between "http://" or "https://" and a terminus like ".com" or ".org") with identifiers of website names such that the storage optimization system queries the database to determine the website.

Figure 1D:
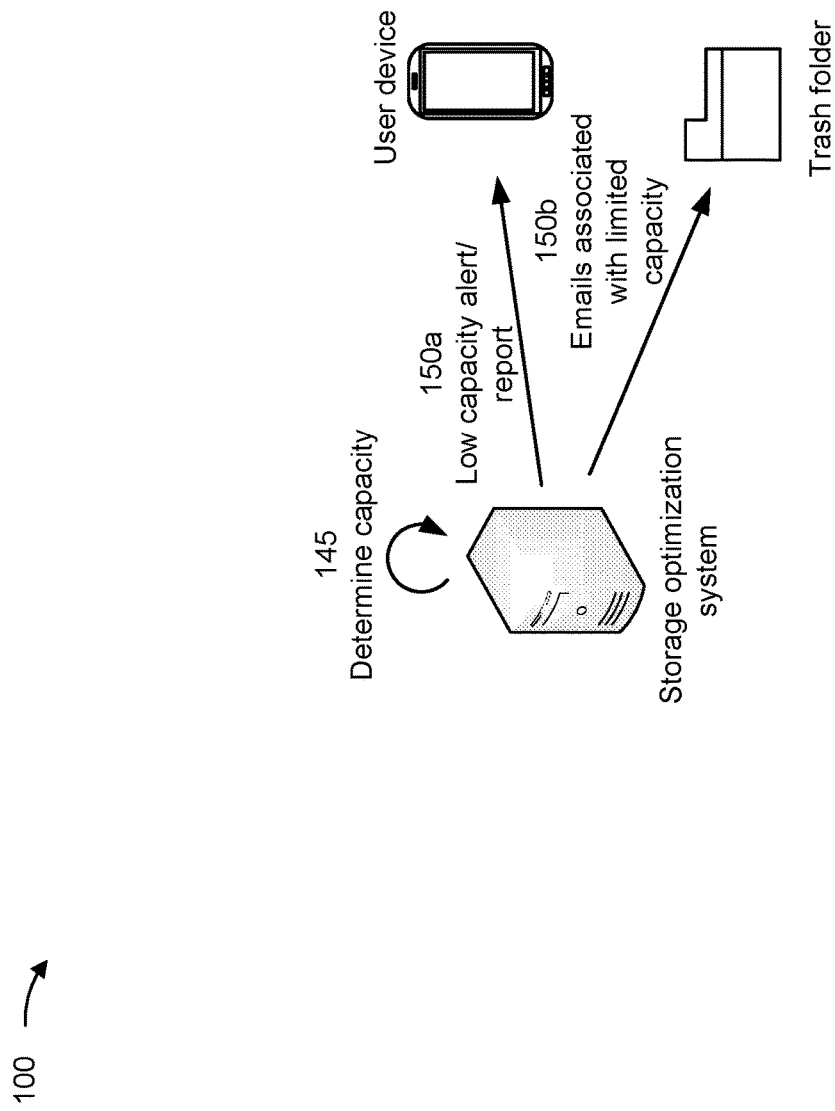

Accordingly, as shown by reference number 135, the storage optimization system may traverse the website using the traversal path and the API. For example, the storage optimization system may execute one or more get functions or otherwise move through the series of URLs indicated by the traversal path. In some implementations, the storage optimization system may use the identifier associated with the event in the URLs (e.g., after a "/event/" portion of a URL and/or in another location indicated by the traversal path). Additionally, the storage optimization system may perform the API call to determine whether the limited capacity is filled. For example, the storage optimization system may include an identifier associated with the event (e.g., identified as described above) as an argument to the API call to receive output from the API indicating whether the limited capacity is filled (e.g., a Boolean indicating whether the event is sold out, an integer indicating a quantity of tickets available, and/or similar output). Accordingly, as shown by reference number 140, the storage optimization system may receive capacity information associated with the event based on using the traversal path and the API. Additionally, as shown in FIG. 1D and by reference number 145, the storage optimization system may determine the limited capacity (e.g., a Boolean indicating whether the limited capacity is low, an integer indicating a quantity of tickets available, and/or similar output).

As shown by reference number 150a, the storage optimization system may transmit a report or alert to a user (e.g., via the user device), associated with the email, that indicates a low capacity associated with the event. For example, the report or alert may include a plaintext email or text message, an HTML email, a PDF file, and/or another electronic version of the report. In some implementations, the report or alert may further indicate capacities that are associated with additional emails that the storage optimization system identifies as being associated with limited capacities.

In some implementations, the storage optimization system may determine that the limited capacity associated with the event satisfies a capacity threshold such that the storage optimization system transmits the report based thereon. For example, the limited capacity associated with the event satisfying the capacity threshold may trigger the storage optimization system to generate the report indicating the limited capacity. Additionally, or alternatively, the storage optimization system may generate a periodic report (e.g., weekly, daily, and/or according to another interval) such that the limited capacity is indicated in the periodic report when the limited capacity associated with the event satisfies the capacity threshold. The capacity threshold may be preconfigured or may be determined according to a setting (e.g., input by the user via the user device).

Additionally, or alternatively, the storage optimization system may determine that the event associated with the limited capacity is consistent with a profile associated with the user such that the storage optimization system transmits the report based thereon. For example, the storage optimization system may scan, from the email associated with the limited time window, text and/or OCR output based on an image (e.g., at least one image) included in the email, to identify the event. In some implementations, the storage optimization system may determine the event using a machine learning model. For example, the storage optimization system may use an ANN, a linear regression, and/or another model trained on historical emails and associated events. The machine learning model may use preconfigured features to identify an associated event and/or may be a deep learning model such that the model may extract new features to identify an associated event. Additionally, or alternatively, to identify the item, the storage optimization system may apply a series of regexes to the text and/or the OCR output. For example, as described above, the regexes may identify patterns associated with event titles, descriptions, and/or categories to identify the associated event.

In some implementations, the storage optimization system may determine that the event is consistent with the profile using a machine learning model. For example, the storage optimization system may use an ANN, a linear regression, and/or another model trained on historical information regarding event purchases associated with the user. In some implementations, the storage optimization system may receive the historical information from, or be at least partially integrated with, a remote server associated with a financial account of the user and/or a merchant account of the user. The machine learning model may use preconfigured features (e.g., keywords in event titles or descriptions, categories associated with events, and/or other similar features) to identify a similarity score (and/or another measure of similarity between the event and the profile associated with the user). Additionally, or alternatively, the machine learning model may be a deep learning model such that the model may extract new features to identify an associated similarity score. The storage optimization system may determine that the event is consistent with the profile associated with the user when the similarity score satisfies a consistency threshold.

In some implementations, the storage optimization system may receive feedback from the user (e.g., via the user device) to update the machine learning model (e.g., to update parameters associated with nodes in a neural network) such that the machine learning model continues to improve in accuracy. For example, the storage optimization system may generate and transmit (e.g., to the user device) a query regarding whether the user is interested in the event. The storage optimization system may further receive an indication that the user was interested and update the machine learning model based thereon.

Additionally, or alternatively, the storage optimization system may determine that the event is consistent with the profile using a series of regexes. For example, as described above, the regexes may identify patterns associated with event titles, descriptions, and/or categories that match titles, descriptions, and/or categories, respectively, of events associated with the profile.

Additionally, or alternatively, and as shown by reference number 150b, the storage optimization system may delete the email associated with the limited capacity based on determining that the limited capacity is filled. As a result, the storage optimization system automatically conserves storage space at the email server or the user device. Additionally, because the storage optimization system may perform operations described above in the background, the user experience is improved as compared with using retention rules programmed by the user.

In some implementations, the storage optimization system may further determine a date associated with the event. For example, the storage optimization system may identify the date associated with the event using a machine learning model and/or regexes similarly as described for expiry dates in connection with FIG. 1B. Further, the storage optimization system may determine whether the date associated with the event has passed. Accordingly, the storage optimization system may delete the email further based on the event having already occurred. As a result, the storage optimization system automatically conserves storage space at the email server or the user device. Additionally, because the storage optimization system may perform operations described above in the background, the user experience is improved as compared with using retention rules programmed by the user.

In some implementations, the storage optimization system may delete the email associated with the limited capacity by moving the email associated with the limited time window to a new folder (shown as a trash folder in example 100). Accordingly, the storage optimization system may delete the email associated with the limited capacity from the new folder after a threshold amount of time has passed. Accordingly, in some implementations, the user may recover the email from the new folder before the threshold amount of time has passed.

Although described using a single limited capacity and/or single event associated with the email, the description similarly applies when the email is associated with a plurality of limited capacities and/or a plurality of events. For example, the storage optimization system may delete the email when the plurality of limited capacities are filled, when the plurality of events are associated with dates that have passed, or a combination thereof.

As indicated above, FIGS. 1A-1D are provided as an example. Other examples may differ from what is described with regard to FIGS. 1A-1D.

Figure 2A:
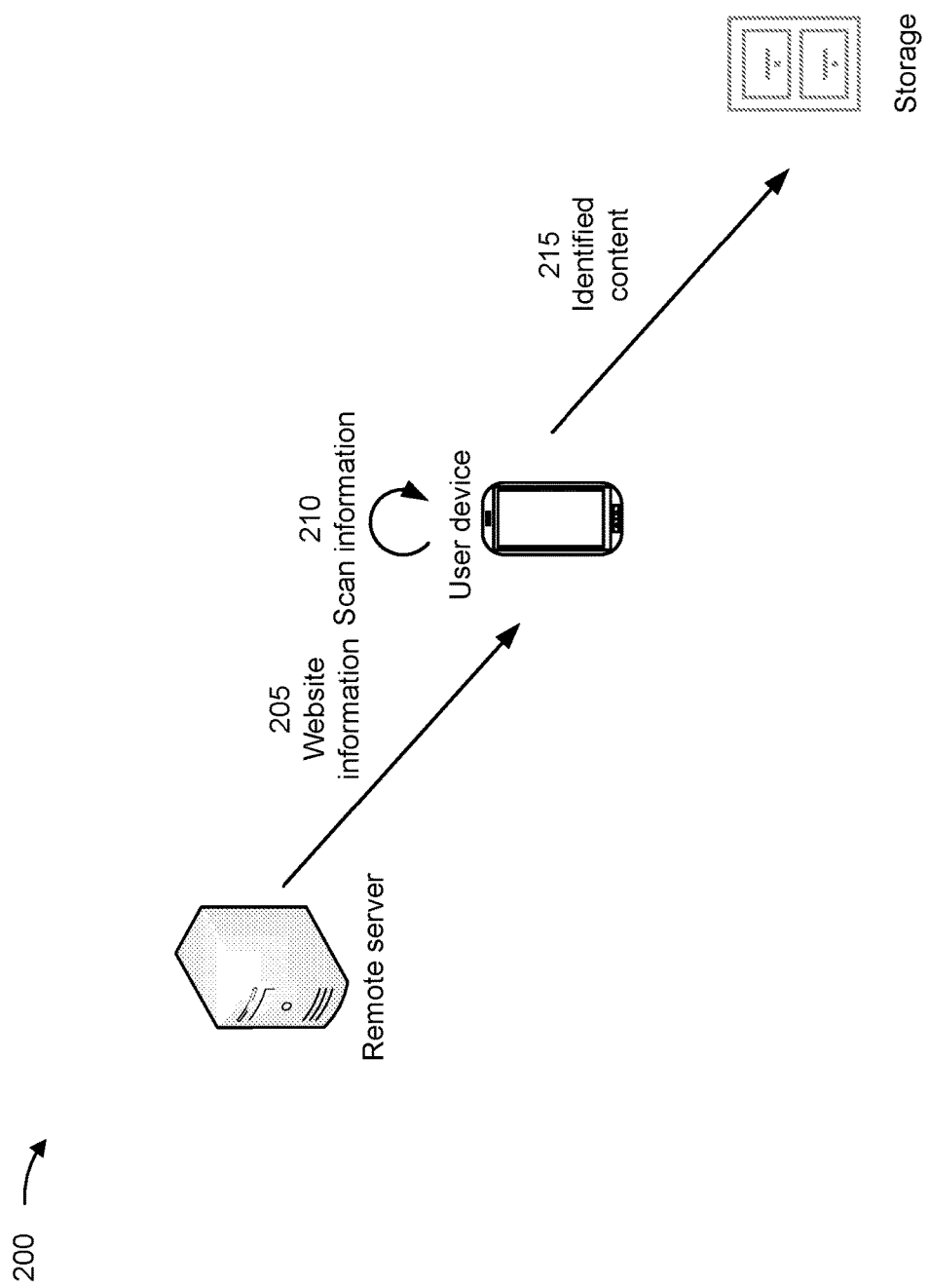
FIGS. 2A-2C are diagrams of an example implementation relating to content prioritization for websites.
Figure 2B:
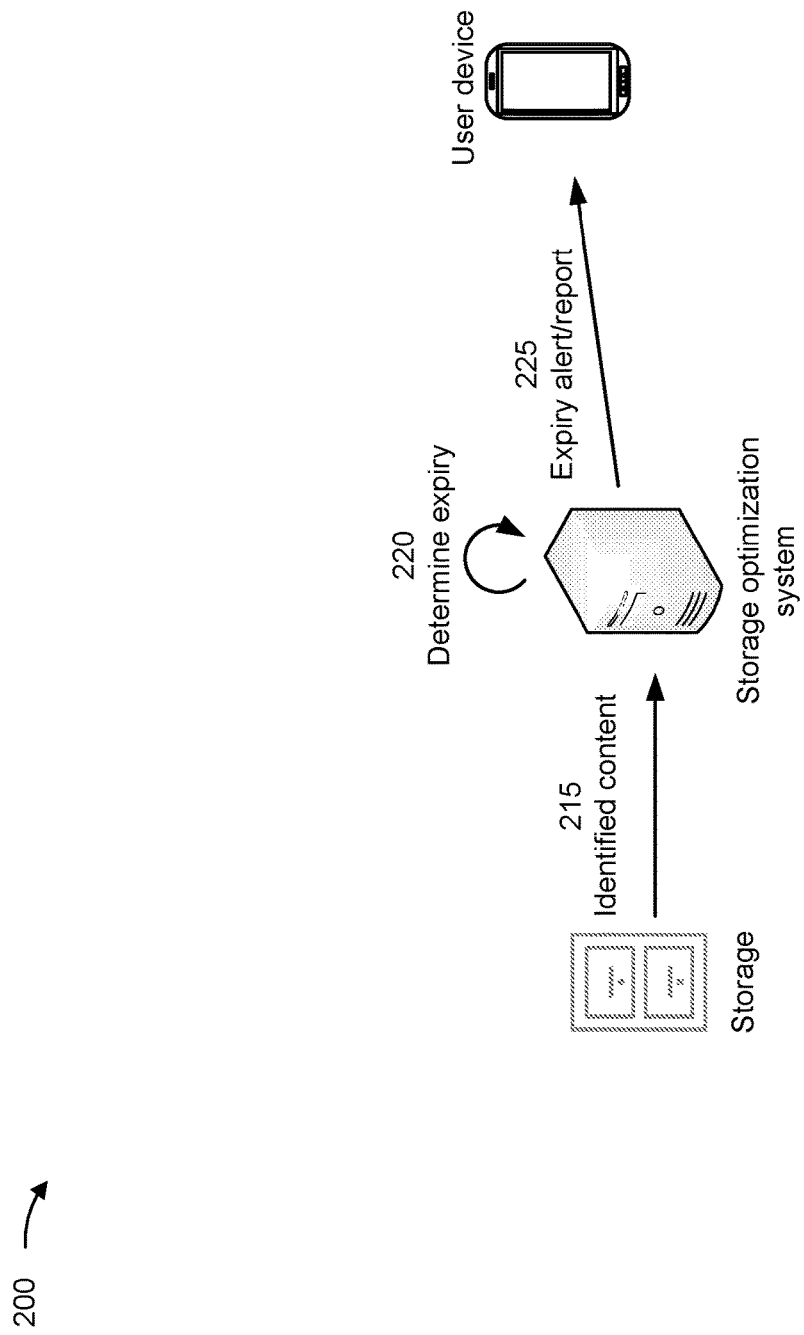
Figure 2C:
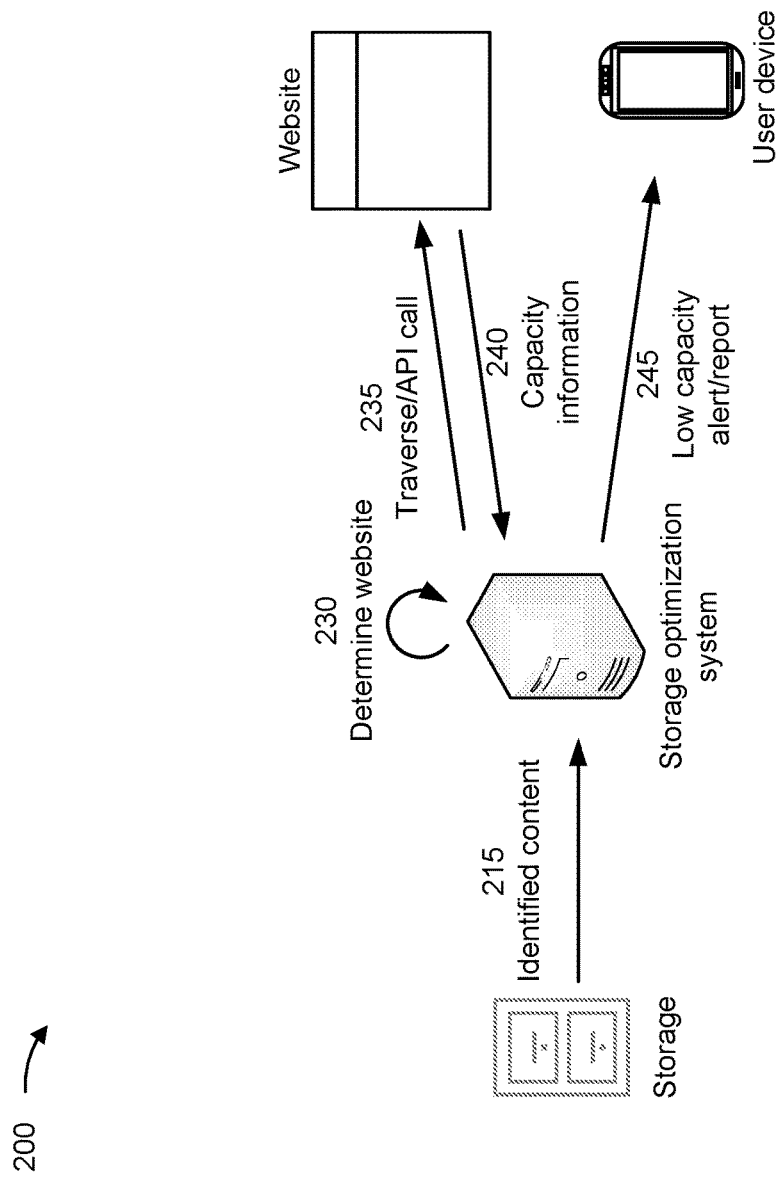

FIGS. 2A-2C are diagrams of an example 200 associated with content prioritization for websites. As shown in FIGS. 2A-2C, example 200 includes a remote server, a storage optimization system, a storage, and a user device. These devices are described in more detail in connection with FIGS. 4 and 5.

As shown in FIG. 2A and by reference number 205, the user device may receive information associated with a website. For example, the user device may request the information from a remote server, and the remote server may provide the information to the user device (e.g., for display to the user via a browser application and/or another piece of software executing on the user device).

As shown by reference number 210, the user device may scan the information received from the remote server. In some implementations, the user device may scan the information during reception. As an alternative, the user device may scan the information after the information is stored in a cache (e.g., a cache associated with the browser application).

Accordingly, as shown by reference number 215, the user device may identify content (e.g., at least a portion of the website information) associated with a limited time window. The user device may move (or copy) the identified content to a partition (e.g., physical, virtual, and/or logical), of a storage, that is associated with limited time windows. As an alternative, the user device may store a flag and/or other indicator in a storage having the content (e.g., included in a storage optimization system or included in the user device) such that the identified content is indicated as being associated with a limited time window. The storage optimization system may process the content associated with the limited time window as described in connection with FIG. 2B.

Additionally, or alternatively, and as shown by reference number 215, the user device may identify content (e.g., at least a portion of the website information) associated with a limited capacity. The user device may move (or copy) the content to a partition (e.g., physical, virtual, and/or logical), of a storage, that is associated with limited capacities. As an alternative, the user device may store a flag and/or other indicator in the storage having the content (e.g., included in a storage optimization system or included in the user device) such that the identified content is indicated as being associated with a limited capacity. The storage optimization system may process the content associated with the limited capacity as described in connection with FIG. 2C.

In some implementations, the storage optimization system may be at least partially integrated (e.g., physically, virtually, and/or logically) with the user device. Accordingly, the storage optimization system may receive the content (as shown in FIG. 2B and FIG. 2C) from a storage included in the user device. As an alternative, the storage optimization system may be a remote server to which the user device transmits the identified content.

As shown in FIG. 2B and by reference number 220, the storage optimization system may determine an expiry date associated with the identified content that is associated with the limited time window. For example, the storage optimization system may determine the expiry date similarly as described above for emails in connection with FIG. 1B.

Accordingly, as shown by reference number 225, the storage optimization system may transmit a report or alert to a user (e.g., via the user device), associated with the content, that indicates the expiry date. For example, the report or alert may include a plaintext email or text message, an HTML email, a PDF file, and/or another electronic version of the report. In some implementations, the report or alert may further indicate expiry dates that are associated with additional content that the storage optimization system identifies as being associated with limited time windows. The storage optimization system may transmit the report or alert according to the triggers described above in connection with FIG. 1B.

Additionally with, or alternatively to, processing the content associated with the limited time window as described in connection with FIG. 2B, the storage optimization system may process the content associated with the limited capacity. For example, as shown in FIG. 2C and by reference number 230, the storage optimization system may determine a website associated with the identified content that is associated with the limited capacity. For example, the storage optimization system may determine the website similarly as described above for emails in connection with FIG. 1C.

Accordingly, as shown by reference number 235, the storage optimization system may traverse the website using the traversal path and the API. For example, the storage optimization system may traverse the website as described above in connection with FIG. 1C. Accordingly, as shown by reference number 240, the storage optimization system may receive capacity information associated with the event based on using the traversal path and the API. Additionally, the storage optimization system may determine the limited capacity (e.g., a Boolean indicating whether the limited capacity is low, an integer indicating a quantity of tickets available, and/or similar output).

As shown by reference number 245, the storage optimization system may transmit a report or alert to a user (e.g., via the user device), associated with the content, that indicates a low capacity associated with the event. For example, the report or alert may include a plaintext email or text message, an HTML email, a PDF file, and/or another electronic version of the report. In some implementations, the report or alert may further indicate capacities that are associated with additional content that the storage optimization system identifies as being associated with limited capacities. The storage optimization system may transmit the report or alert according to the triggers described above in connection with FIG. 1D.

As indicated above, FIGS. 2A-2C are provided as an example. Other examples may differ from what is described with regard to FIGS. 2A-2C.

Figure 3:
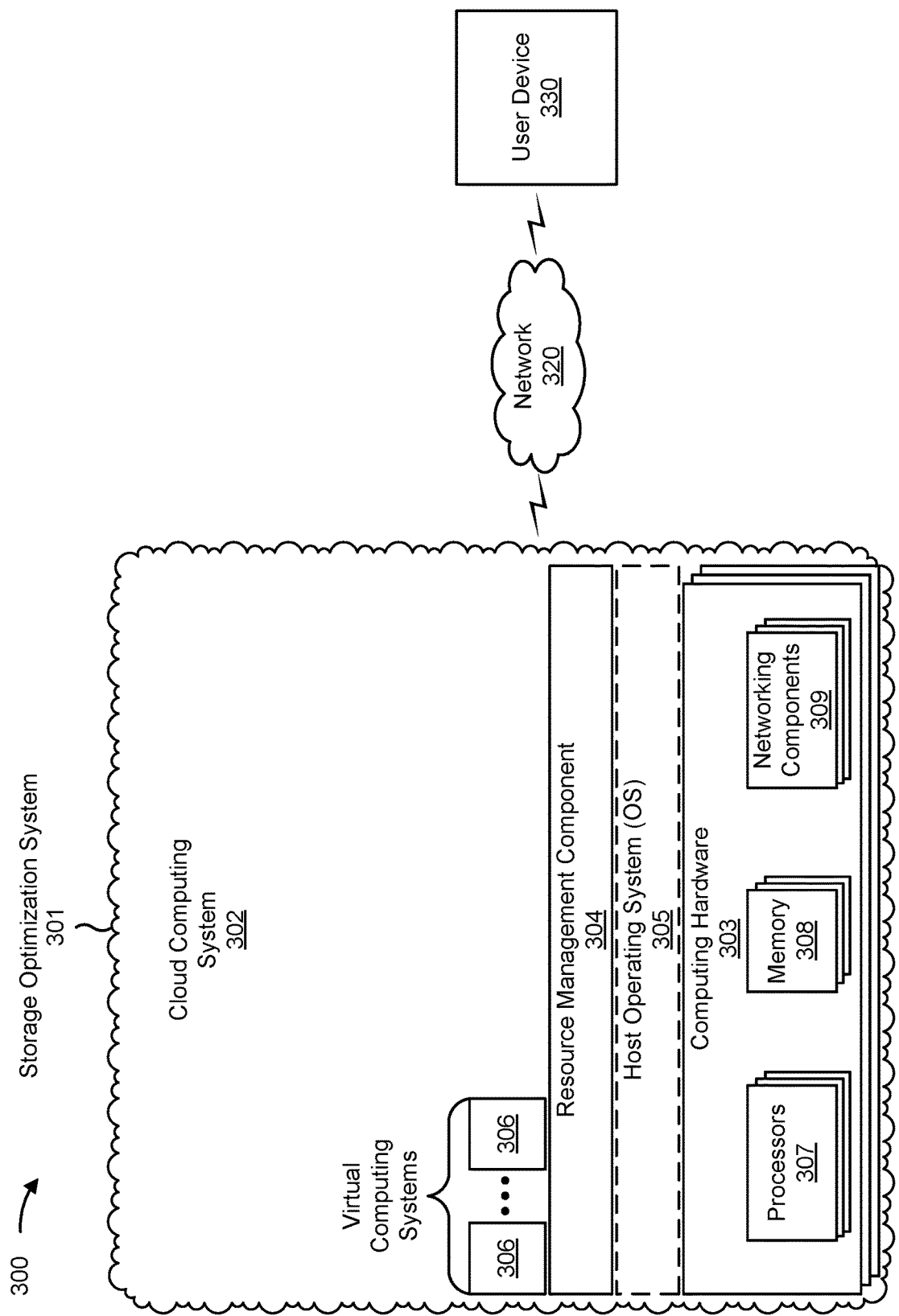
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a storage optimization system 301, which may include one or more elements of and/or may execute within a cloud computing system 302. The cloud computing system 302 may include one or more elements 303-306, as described in more detail below. As further shown in FIG. 3, environment 300 may include a network 320 and a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the storage optimization system 301 may include one or more elements 303-306 of the cloud computing system 302, may execute within the cloud computing system 302, and/or may be hosted within the cloud computing system 302, in some implementations, the storage optimization system 301 may not be cloud-based (e.g., may be implemented outside of a cloud computing system) or may be partially cloud-based. For example, the storage optimization system 301 may include one or more devices that are not part of the cloud computing system 302, such as device 500 of FIG. 5, which may include a standalone server or another type of computing device. The storage optimization system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The user device 330 may include one or more devices capable of using the storage optimization system 301 to optimize email storage space. The user device 330 may include a communication device. For example, the user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 330 may communicate with the storage optimization system 301 to determine which emails to delete, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
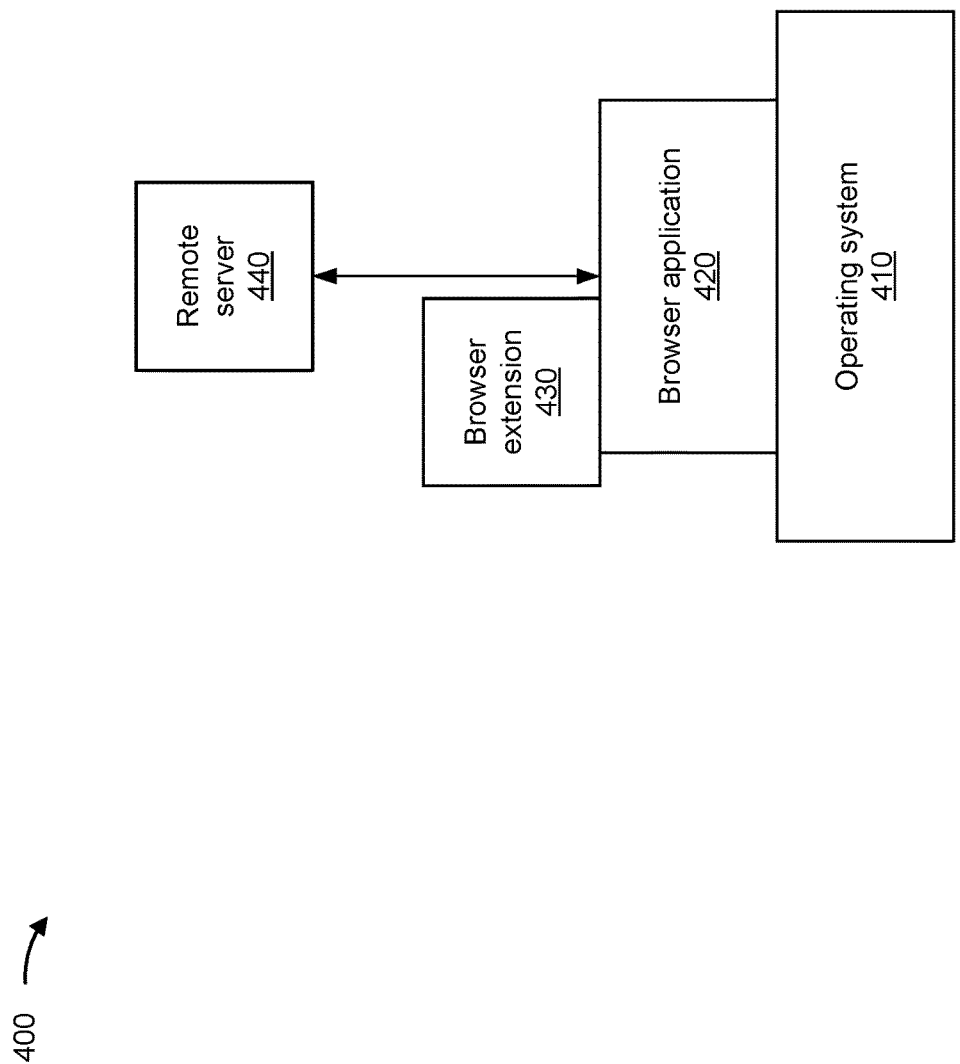
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an operating system 410, a browser application 420 (e.g., supported by the operating system 410), and a browser extension 430 (e.g., supported by the browser application 420), as described in more detail below. Additionally, as further shown in FIG. 4, environment 400 may include a remote server 440. Devices and/or elements of environment 400 may interconnect via wired connections and/or wireless connections.

Figure 5:
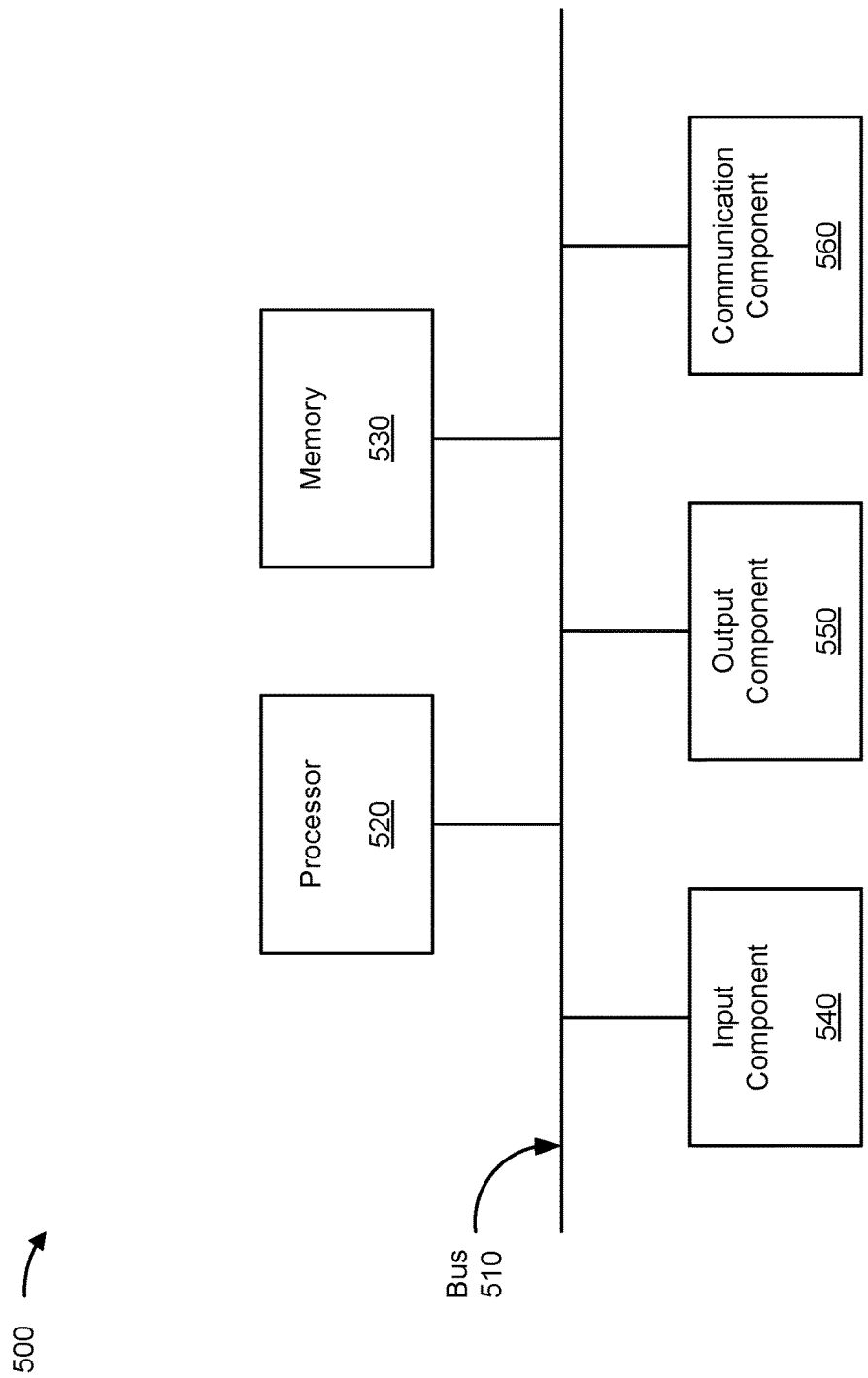
FIG. 5 is a diagram of example components of one or more devices of FIGS. 3 and 4.

The operating system 410 may include system software capable of managing hardware of a user device (which may include, for example, one or more components of device 500 of FIG. 5) and providing an environment for execution of higher-level software, such as the browser application 420. For example, the operating system 410 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 410 may additionally provide a graphical user interface (GUI) and process input from a user.

The browser application 420 may include an executable capable of running on a user device using the operating system 410. The browser application 420 may communicate with the remote server 440. For example, the browser application 420 may user hypertext transfer protocol (HTTP), file transfer protocol (FTP), and/or other Internet- or network-based protocols to request information from, transmit information to, and receive information from the remote server 440. Additionally, the browser application 420 may communicate with the browser extension 430 to determine portions of a cache, associated with the remote server 440, to prioritize content for the user of the user device, as described elsewhere herein.

The browser extension 430 may include a plug-in or another type of software that executes on top of the browser application 420. In some implementations, the browser extension 430 may be at least partially integrated into the browser application 420. Additionally, or alternatively, the browser extension 430 may at least partially operate independently of the browser application 420. The browser extension 430 may determine portions of a cache, associated with the remote server 440, to prioritize for the user of the user device, as described elsewhere herein.

The remote server 440 may include remote computing devices that provide information to requesting devices over the Internet and/or another network (e.g., similar to network 320 of FIG. 3). The remote server 440 may include a standalone server, one or more servers included on a server farm, or one or more servers spread across a plurality of server farms. In some implementations, the remote server 440 may include a cloud computing system (e.g., similar to cloud computing system 302 of FIG. 3). As an alternative, the remote server 440 may include one or more devices, such as device 500 of FIG. 5, that may include a standalone server or another type of computing device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a diagram of example components of a device 500, which may correspond to an authentication system and/or a mobile device. In some implementations, an authentication system and/or a mobile device include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a fieldprogrammable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
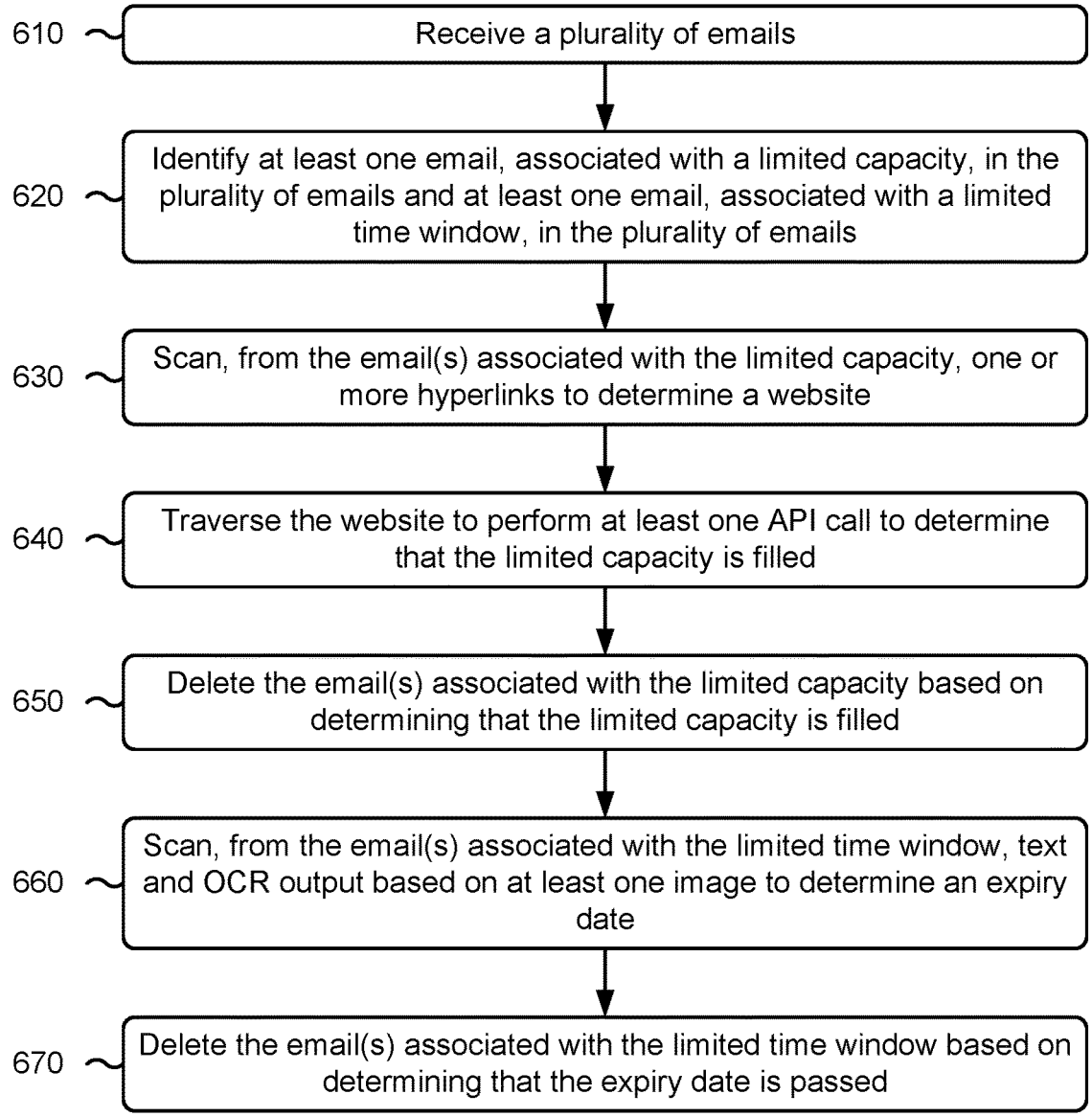
FIG. 6 is a flowchart of an example process relating to storage space optimization for emails.

FIG. 6 is a flowchart of an example process 600 associated with storage space optimization for emails. In some implementations, one or more process blocks of FIG. 6 may be performed by a system (e.g., storage optimization system 301). In some implementations, one or more process blocks of FIG. 6 may be performed by another device or a group of devices separate from or including the system, such as user device 330. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving a plurality of emails (block 610). As further shown in FIG. 6, process 600 may include identifying at least one email, associated with a limited capacity, in the plurality of emails (block 620). Additionally, or alternatively, and as shown in FIG. 6, process 600 may include identifying at least one email, associated with a limited time window, in the plurality of emails (block 620). As further shown in FIG. 6, process 600 may include scanning, from the at least one email associated with the limited capacity, one or more hyperlinks to determine a website (block 630). Additionally, as further shown in FIG. 6, process 600 may include traversing the website to perform at least one API call to determine that the limited capacity is filled (block 640). Accordingly, as shown in FIG. 6, process 600 may include deleting the at least one email associated with the limited capacity based on determining that the limited capacity is filled (block 650). Additionally, or alternatively, and as further shown in FIG. 6, process 600 may include scanning, from the at least one email associated with the limited time window, text and OCR output based on at least one image to determine an expiry date (block 660). Accordingly, as shown in FIG. 6, process 600 may include deleting the at least one email associated with the limited time window based on determining that the expiry date is passed (block 670).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for optimizing email storage space, the system comprising:
one or more memories; and
one or more processors, coupled to the one or more memories, configured to:
identify at least one email associated with a limited capacity at an event and at least one email associated with a limited time window;
scan the at least one email associated with the limited capacity at the event to determine a website;
traverse the website to determine that the limited capacity at the event is filled;
delete the at least one email associated with the limited capacity at the event based on traversing the website to determine that the limited capacity at the event is filled;
scan, from the at least one email associated with the limited time window, text included in the at least one email associated with the limited time window to determine an expiry date; and
transmit an alert for the at least one email associated with the limited time window based on the expiry date.

2. The system of claim 1, wherein the one or more processors, to scan the at least one email associated with the limited capacity at the event, are to:
apply a first pattern recognition to the at least one email associated with the limited capacity at the event to determine the website; and
apply a second pattern recognition to the at least one email associated with the limited capacity at the event to determine an identifier of the website.

3. The system of claim 1, wherein the alert includes one or more of:
a plaintext email,
a text message,
a hypertext markup language (HTML) email,
a portable document format (PDF) file, or
another electronic version of a report.

4. The system of claim 1, wherein the one or more processors, to transmit the alert, are to:
determine that the expiry date is within a threshold amount of time of a current date; and
transmit the alert based on the determination.

5. The system of claim 1, wherein the one or more processors, to identify the at least one email associated with the limited capacity and the at least one email associated with the limited time window, are to:
sort a plurality of emails using one or more regular expressions that identify patterns associated with dates and identify patterns associated with capacity.

6. The system of claim 1, wherein the one or more processors, to delete the at least one email associated with the limited capacity at the event, are to:
move the at least one email associated with the limited capacity at the event to a new folder; and
delete the at least one email associated with the limited capacity at the event from the new folder after a threshold amount of time has passed.

7. The system of claim 1, wherein the one or more processors, to transmit the alert, are to:
transmit the alert based on the event being consistent with a profile of a user of the at least one email associated with the limited time window.

8. A method, comprising:
identifying at least one email associated with a limited capacity window and at least one email associated with a limited time window;
scanning the at least one email associated with the limited capacity window to determine a website;
traversing the website to determine that the limited capacity window is filled;
deleting the at least one email associated with the limited capacity window based on traversing the website;
scanning, from the at least one email associated with the limited time window, text included in the at least one email associated with the limited time window to determine an expiry date; and
transmitting an alert for the at least one email associated with the limited time window based on the expiry date.

9. The method of claim 8, wherein the limited capacity window is one or more of:
a limited stock,
a limited amount of supplies, or
a limited amount of tickets.

10. The method of claim 8, further comprising:
determining the expiry date by one or more of:
scanning an optical character recognition (OCR) output based on an image included in the at least one email associated with the expiry date,
applying a series of regexes to text of the at least one email associated with the expiry date, or
using a machine learning model.

11. The method of claim 8, wherein transmitting the alert comprises:
determining that the expiry date is within a threshold amount of time of a current date; and
transmitting the alert based on the determination.

12. The method of claim 8, wherein transmitting the alert for the at least one email associated with the limited time window based on the expiry date comprises:
determining that an item associated with the expiry date is consistent with a profile using a machine learning model; and
transmitting the alert based on the determination.

13. The method of claim 8, wherein deleting the at least one email associated with the limited capacity window comprises:
- moving the at least one email associated with the limited capacity window to a new folder; and
- deleting the at least one email associated with the limited capacity window from the new folder after a threshold amount of time has passed.

14. The method of claim 8, further comprising:
- deleting the at least one email associated with the limited time window based on determining that the expiry date is passed.

15. A non-transitory computer-readable medium storing a set of instructions, the set of instructions comprising:
- one or more instructions that, when executed by one or more processors of a device, cause the device to:
  - identify at least one email associated with a limited capacity at an event and at least one email associated with a limited time window;
  - scan the at least one email associated with the limited capacity at the event to determine a website;
  - transmit an alert for the at least one email associated with the limited capacity based on traversing the website to determine whether the limited capacity at the event is filled;
  - scan, from the at least one email associated with the limited time window, text included in the at least one email associated with the limited time window to determine an expiry date; and
  - delete the at least one email associated with the limited time window based on the expiry date.

16. The non-transitory computer-readable medium of claim 15, wherein the one or more processors, to transmit the alert for the at least one email associated with the limited capacity based on traversing the website to determine whether the limited capacity at the event is filled, cause the device to:
- transmit the alert associated with the at least one email associated with the limited capacity to indicate a low capacity associated with the event.

17. The non-transitory computer-readable medium of claim 15, wherein the one or more processors, to traverse the website, cause the device to:
- scan, from the at least one email associated with the limited capacity at the event, one or more hyperlinks to determine the website associated with the at least one email associated with the limited capacity at the event.

18. The non-transitory computer-readable medium of claim 15, wherein the one or more processors, to delete the at least one email associated with the limited time window based on the expiry date, cause the device to:
- delete the at least one email associated with the limited time window based on determining that the expiry date is passed.

19. The non-transitory computer-readable medium of claim 15, wherein the one or more processors, to delete the at least one email associated with the limited time window, cause the device to:
- move the at least one email associated with the limited time window to a new folder; and
- delete the at least one email associated with the limited time window from the new folder after a threshold amount of time has passed.

20. The non-transitory computer-readable medium of claim 15, wherein the one or more instructions, when executed by the one or more processors, further cause the device to:
- determine, using a database, a traversal path and at least one application programming interface (API) call associated with the website; and
- traverse the website using the traversal path and the at least one API using the identifier to determine whether the limited capacity at the event is filled.

\* \* \* \* \*